(12) United States Patent
Kofuji

(10) Patent No.: US 6,994,365 B2
(45) Date of Patent: Feb. 7, 2006

(54) LINK-TYPE FRONT SUSPENSION DEVICE IN MOTORCYCLE

(75) Inventor: Kenji Kofuji, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/645,513

(22) Filed: Aug. 22, 2003

(65) Prior Publication Data

US 2004/0036250 A1    Feb. 26, 2004

(30) Foreign Application Priority Data

Aug. 26, 2002    (JP) .............................. 2002-245857

(51) Int. Cl.
*B62D 61/02*    (2006.01)
*B62K 11/12*    (2006.01)

(52) U.S. Cl. ..................................... 280/277
(58) Field of Classification Search ................ 180/219; 280/275, 276, 277
See application file for complete search history.

(56) References Cited

U.S. PATENT DOCUMENTS

| | | | | |
|---|---|---|---|---|
| 4,775,163 A * | 10/1988 | McGowan et al. | ......... | 280/277 |
| 6,164,675 A * | 12/2000 | Pickering | .................... | 280/277 |
| 6,336,647 B1 * | 1/2002 | Iwai et al. | .................. | 280/276 |
| 6,357,775 B1 * | 3/2002 | Iwai et al. | .................. | 280/276 |
| 2001/0019197 A1 * | 9/2001 | Ito et al. | .................... | 280/276 |
| 2001/0022438 A1 * | 9/2001 | Ito et al. | .................... | 280/274 |
| 2001/0026058 A1 * | 10/2001 | Ito et al. | .................... | 280/276 |

FOREIGN PATENT DOCUMENTS

JP    11-91672 A    4/1999

* cited by examiner

*Primary Examiner*—Kevin Hurley
(74) *Attorney, Agent, or Firm*—Birch, Stewart, Kolasch & Birch, LLP

(57) ABSTRACT

A link-type front suspension device for a motorcycle to improve an engine cooling efficiency without restricting a flow of engine cooling air during its running operation. The suspension device includes a split push rod having a pair of right and left rod members, the lower ends of which are rotatably attached to the front wheel supporting arms, and the upper ends of which are rotatably attached to the cushion arms. In addition, the rod members are arranged to the rear of each of the pair of right and left front forks in such a way that they overlap the forks as seen from a front elevational view. Accordingly, there is no element above the front fender and between the right and left front forks, and a appropriate wide space is formed therebetween, the space acting as an engine cooling air feeding inlet during the running operation.

21 Claims, 10 Drawing Sheets

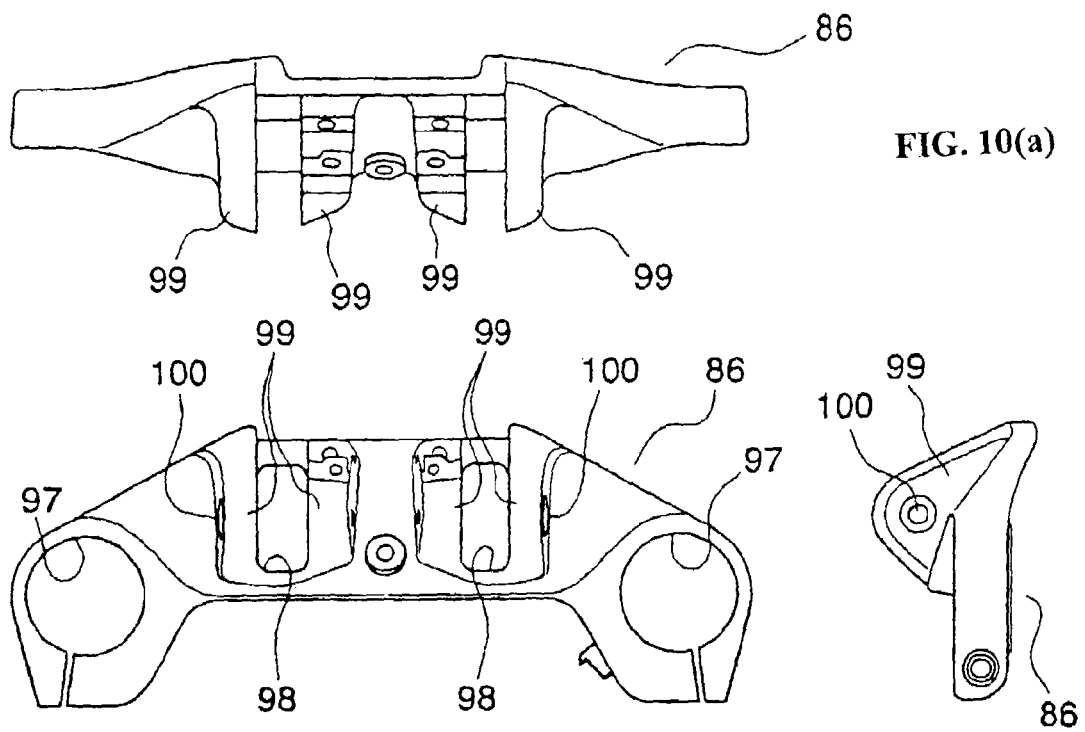
FIG. 10(a)
FIG. 10(b)
FIG. 10(d)
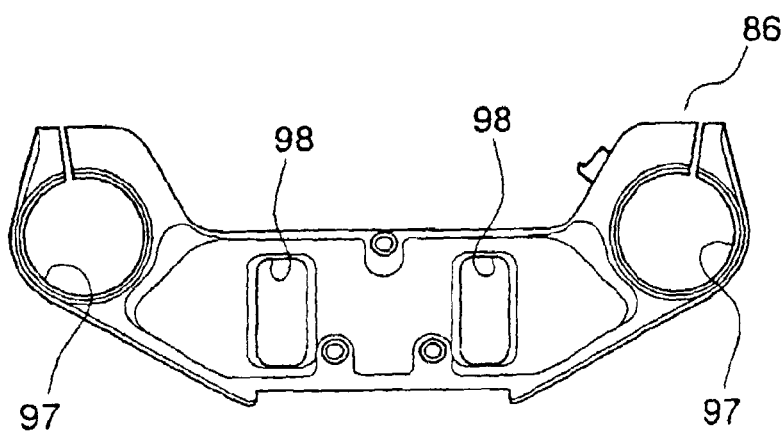
FIG. 10(c)

LINK-TYPE FRONT SUSPENSION DEVICE IN MOTORCYCLE

CROSS-REFERENCE TO RELATED APPLICATION

The present application claims priority under 35 USC 119 to Japanese Patent Application No. 2002-245857 filed on Aug. 26, 2002, the entire contents thereof is hereby incorporated by reference.

BACKGROUND OF THE INVENTION

1. Field of the Invention

This invention relates to a link-type front suspension device in a vehicle such as a motorcycle.

2. Description of Background Art

In the gazette of Japanese Patent Laid-open No. Hei 11-91672, for example, is described a structure having a shock absorber acting as a link-type front suspension device assembled into a motorcycle. The structure includes a pair of right and left front forks extending in a vertical direction while holding a front wheel between them, and further having upper ends supported at the chassis frame in such a way that they can be steered. A push rod is arranged in a substantial parallel direction with these front forks, a front wheel supporting arm rotatably is connected to a lower end of the push rod and rotatably supporting a front wheel shaft, and a shock absorber is installed between the upper end of the push rod and the front forks.

The link-type front suspension device described in the aforesaid gazette had some problems described as follows.

In general, it is desired in a motorcycle that an engine be installed at a rear part of a front suspension device, and that other elements, except for a radiator, not be installed at a front part of the engine. Otherwise, running wind does not strike against the engine.

However, the link-type front suspension device described in the aforesaid gazette has a problem that the running wind is prevented from directly striking against the engine by a bow-like connecting member. This is because the push rod includes right and left rod members and the bow-like connecting member connecting these right and left rod members and connecting them to the shock absorbers. As such, the bow-like connecting member is arranged so as to close the upper space of front fender.

In addition, irrespective of the fact that an input load is inputted from two directions, it was necessary to have a thick wall thickness of the bow-like connecting member so as to assure a rigidity at the central part of the bow-like connecting member where the link part is connected.

SUMMARY AND OBJECTS OF THE PRESENT INVENTION

The present invention has been invented in view of the aforesaid circumstances. It is an object of the present invention to provide a link-type front suspension device in a vehicle such as a motorcycle in which a cooling efficiency of the engine can be improved without prohibiting a flow of the engine cooling wind during its running operation.

In order to accomplish the aforesaid object, a first aspect of the present invention includes a pair of right and left front forks rotatably supported at a front part of a chassis frame; a front wheel supporting arm having one end rotatably attached to lower ends of said pair of right and left front forks and having the other end rotatably supporting an axle of a front wheel; a cushion arm rotatably attached to a bottom bridge in a vertical direction; a push rod rotatably connected at its lower end to an intermediate part of the front wheel supporting arm and at its upper end to the cushion arm; and shock absorbers installed between the upper part of said front fork and said cushion arm, wherein said push rod is a split structure including a pair of right and left rod members, lower ends of these rod members are rotatably attached to the front wheel supporting arm and at the same time the upper ends of the rod members are rotatably attached to said cushion arm.

In this case, there are no elements disposed between the right and left front forks above the front fender that would restrict a flow of running wind toward the engine. This is accomplished because the push rod is constituted by a pair of right and left rod members, and their upper ends are fixed directly to the cushion arm, making it possible to guide running wind passing above the front fender positively toward the engine. Thus, engine cooling is promoted.

In addition, constitution of the push rod by a pair of right and left rod members may lead to a division of the link, and the load in the two directions is supported by the two links as described above. Thus, it is possible to decrease a wall thickness at the link connecting part. In view of this fact, an air guiding characteristic can be improved.

According to a second aspect of the present invention, the rod members constituting said push rod are arranged at rear sides of said pair of right and left front forks in such a way that they overlap the front forks as seen in a front elevational view.

In this case, since the pair of right and left rod members constituting the push rod are arranged to overlap at the rear of the front fork, the space between the right and left front forks is not closed or not metered by the right and left rod members arranged at the rear part of the right and left forks. Thus, running wind can be positively guided to the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 10(a)–(d) show a preferred embodiment of the present invention and illustrate four views of an upper bracket of a composing element of a link-type front suspension device.

DETAILED DESCRIPTION OF THE PREFERRED EMBODIMENTS

Figure 1:
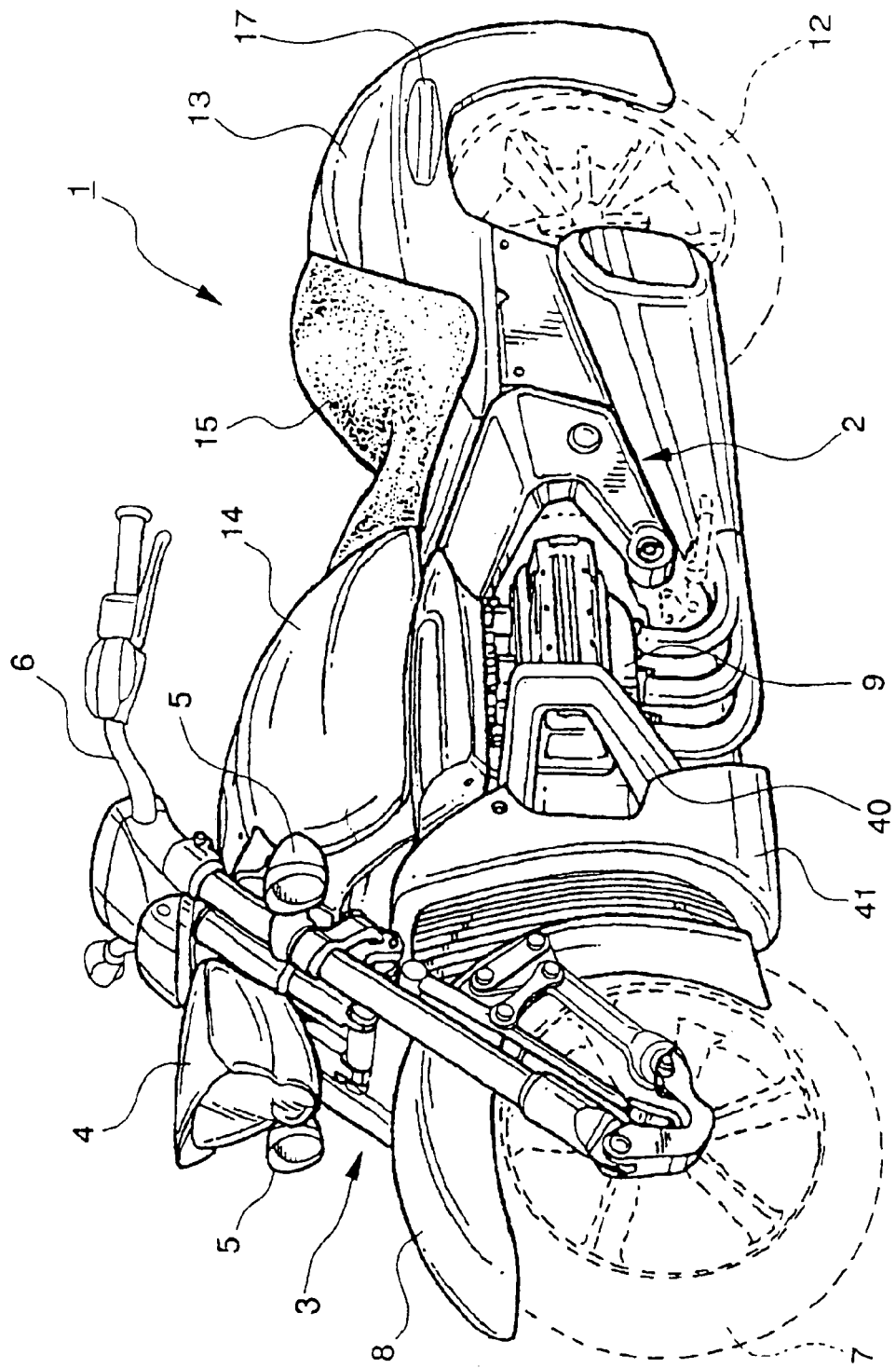
FIG. 1 is a perspective view for showing a preferred embodiment of the present invention, a motorcycle having a link-type front suspension device of the present invention.

Referring to the drawings, a preferred embodiment of the present invention of a motorcycle provided with the link-type front suspension device will be described as follows. In the description, description about directions such as a forward or rearward and a rightward or leftward is based on a chassis.

Figure 2:
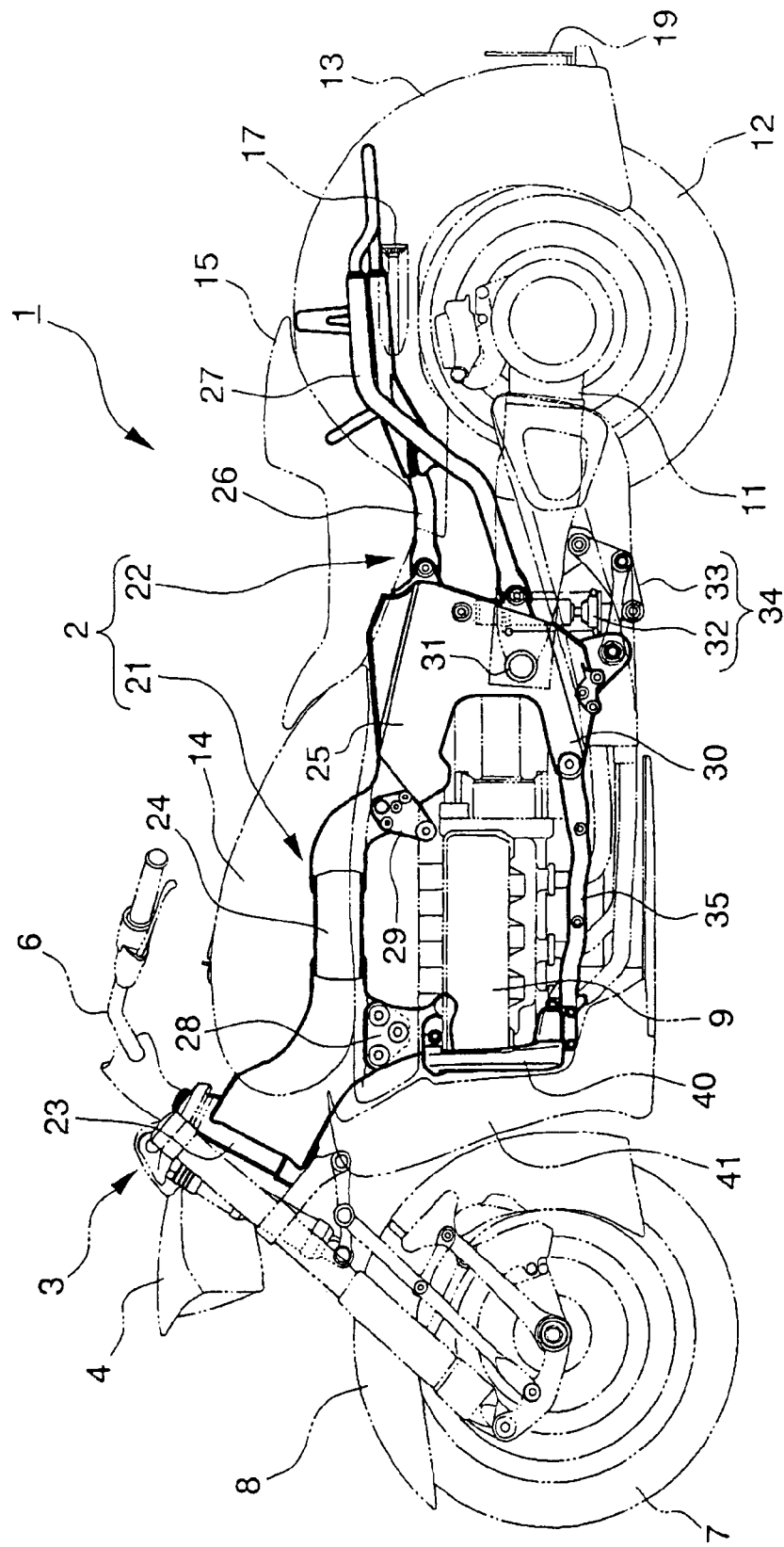
FIG. 2 is a side elevational view for showing a preferred embodiment of the present invention, a motorcycle having a link-type front suspension device of the present invention.

FIG. 1 is a side elevational view for showing an entire configuration of a motorcycle provided with the link-type front suspension device of the present invention, and FIG. 2 shows a side elevational view for showing the motorcycle.

The motorcycle 1 is a so-called American type, wherein it has a chassis frame 2, a link-type front suspension device 3 rotatably supported at a front end of the chassis frame 2, a headlight 4 arranged at an upper part of the link-type front suspension device 3, a pair of right and left winkers 5 arranged below the headlight 4 of the link-type front suspension device 3, and a steering handle 6 fixed to an upper end of the link-type front suspension device 3 and arranged at an upper part of the chassis front part.

In addition, this motorcycle 1 is comprised of a front wheel 7 rotatably supported at link-type front suspension device 3, a front fender 8 supported at the link-type front suspension device 3 and covering the upper side of the front wheel 7, and an engine 9 mounted at the chassis frame 2. The motorcycle 1 also includes a rear swing arm 11 slidably arranged around an axis extending along a lateral direction at the rear part of the chassis by the chassis frame 2, a rear wheel 12 rotatably mounted at the rear end of the rear swing arm 11 and rotated with a driving force of the engine 9, and a rear fender 13 supported by the chassis frame 2 and covering the upper side of the rear wheel 12.

Further, this motorcycle 1 is comprised of a tear-drop type fuel tank 14 arranged at an upper part of the chassis frame 2, a main seat 15 arranged at a rear part of the fuel tank 14 and where a driver sits, a pair of right and left rear winkers 17 arranged at a rear part of the rear fender 13, and a license plate fixing part 19 arranged at the rear end of the rear fender 13.

The chassis frame 2 is comprised of a front frame 21 and a rear frame 22 each of which is arranged at a forward or a rearward part of it.

The front frame 21 is comprised of a front end head pipe 23, an upper frame 24 divided from the head pipe 23 into a right segment and a left segment, extended in a slant lower rearward direction and further extending rearwardly in a horizontal direction, and a down frame 25 comprised of a pair of right and left plate members having a substantial U-shape as seen in its side elevational view welded to the rear end of the upper frame 22, extending rearwardly in a slightly slant downward direction, extending rearwardly in a horizontal direction, extending from it in a downward direction, and having its lower end extending in a forward direction, and a plurality of connector members for connecting these pairs of right and left plate members.

In addition, the rear frame 22 is comprised of right and left upper pipes 26 connected to the upper rear end of the down frame 25 and raised from it, and right and left down pipes 27 connected to the substantial central rear end in a height direction of the down frame 25, extending from it in a slant upper rearward direction, connected to the midway part of the upper pipe 26 and from it extending in a rearward horizontal direction.

The engine 9 is a so-called horizontal opposite type engine in which the right cylinder head, left cylinder head, right cylinder and left cylinder are arranged to be inclined outwardly to be oppositely faced to each other. The engine 9 is suspended by the engine hanger 28 formed at a lower part of the upper frame 24, the engine hanger 29 formed at a lower surface of the upper part of the down frame 25 and the engine hanger 30 formed at a front end of the lower part of the down frame 25.

The rear swing arm 11 oscillates around a pivot 31 of the down frame 25 in a vertical direction with a base part of the front end being pivoted at the pivot 31 of the down frame. In addition, a rear suspension device 34 comprised of a cushion unit 32 and the link mechanism 33 is placed between the rear swing arm 11 and the down frame 25, whereby the rear wheel 12 dampens and absorbs vibration transmitted from the road surface.

FIGS. 1 and 2 show a side frame 35 placed at a side part of an engine 9 so as to connect the engine with a down frame, and an engine guard 40 for protecting the engine and a radiator cover 41, respectively.

Figure 3:
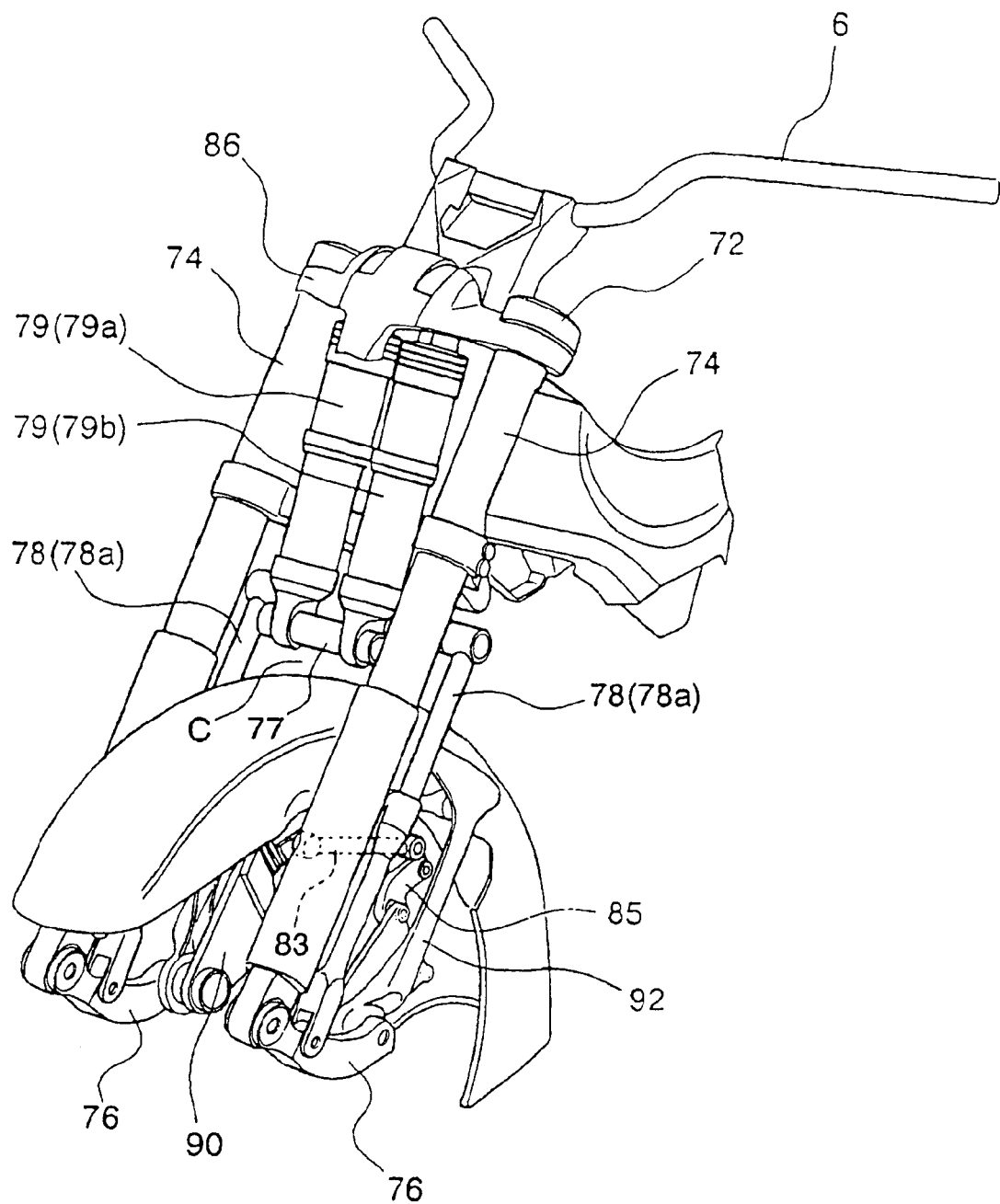
FIG. 3 is a perspective view for showing a preferred embodiment of the present invention, a front segment of a motorcycle having a link-type front suspension device of the present invention.
Figure 4:
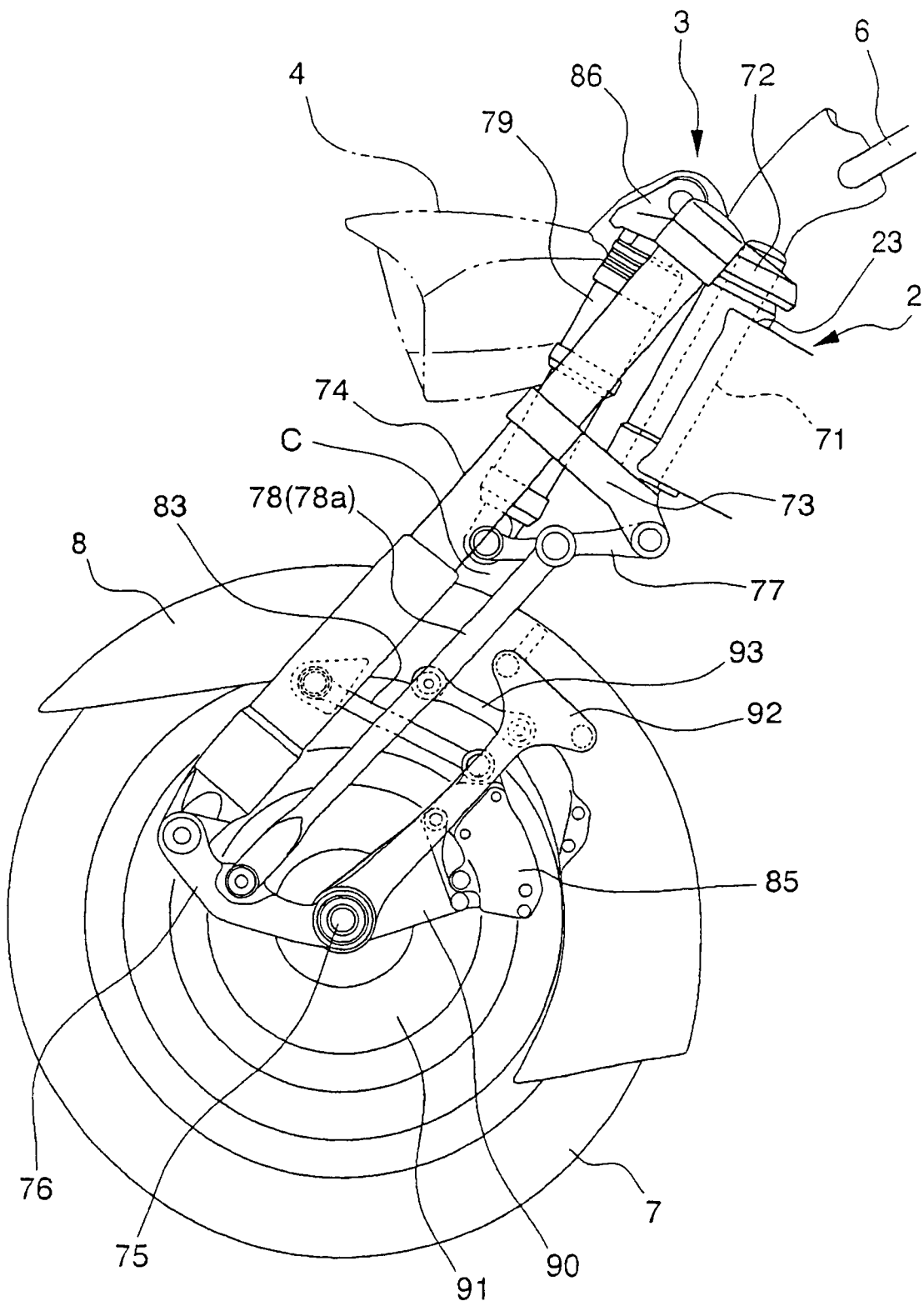
FIG. 4 is a side elevational view for showing a preferred embodiment of the present invention, a front segment of a motorcycle having a link-type front suspension device of the present invention.
Figure 5:
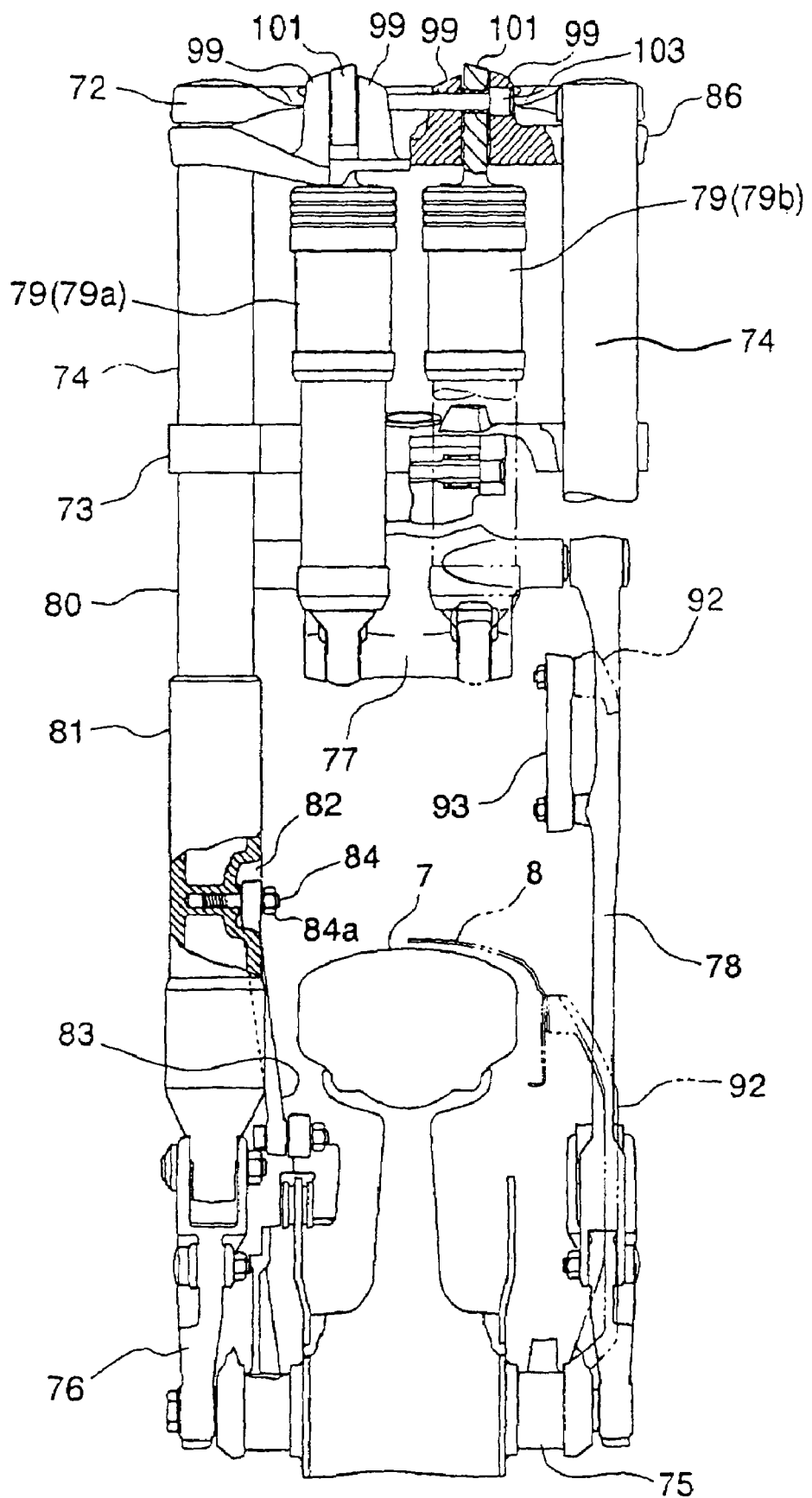
FIG. 5 is a front elevational view with a part being sectioned for showing a preferred embodiment of the present invention and a link-type front suspension device.

As can be seen in FIGS. 3–5, the link-type front suspension device 3 is comprised of a steering stem 71 supported at a head pipe 23 installed at a front part of a chassis frame 2 while being rotatably inserted around its axis; a top bridge 72 fixed to the upper part of the steering stem 71 and a bottom bridge 73 fixed to a lower part of the steering stem 71; and a pair of right and left front forks 74 fixed at the top portions to the top bridge 72 and the bottom bridge 73.

The link-suspension device 3 also is comprised of front wheel supporting arms 76 having front ends (one end side) rotatably arranged at the lower ends of the pair of right and left front forks 74 in a vertical direction and having rear ends (the other end side) rotatably supporting the axle 75 of the front wheel 7 in a vertical direction; a cushion arm 77 rotatably attached at its rear end to the bottom bridge in a vertical direction; a push rod 78 having the lower end rotatably attached at an intermediate part of the front wheel supporting arm 76 in a vertical direction and having the upper end rotatably attached at an intermediate part of the cushion arm 77 in a vertical direction; and a shock absorber 79 installed between the front end of the upper bracket 86 and a front end of the cushion arm 77.

Figure 6:
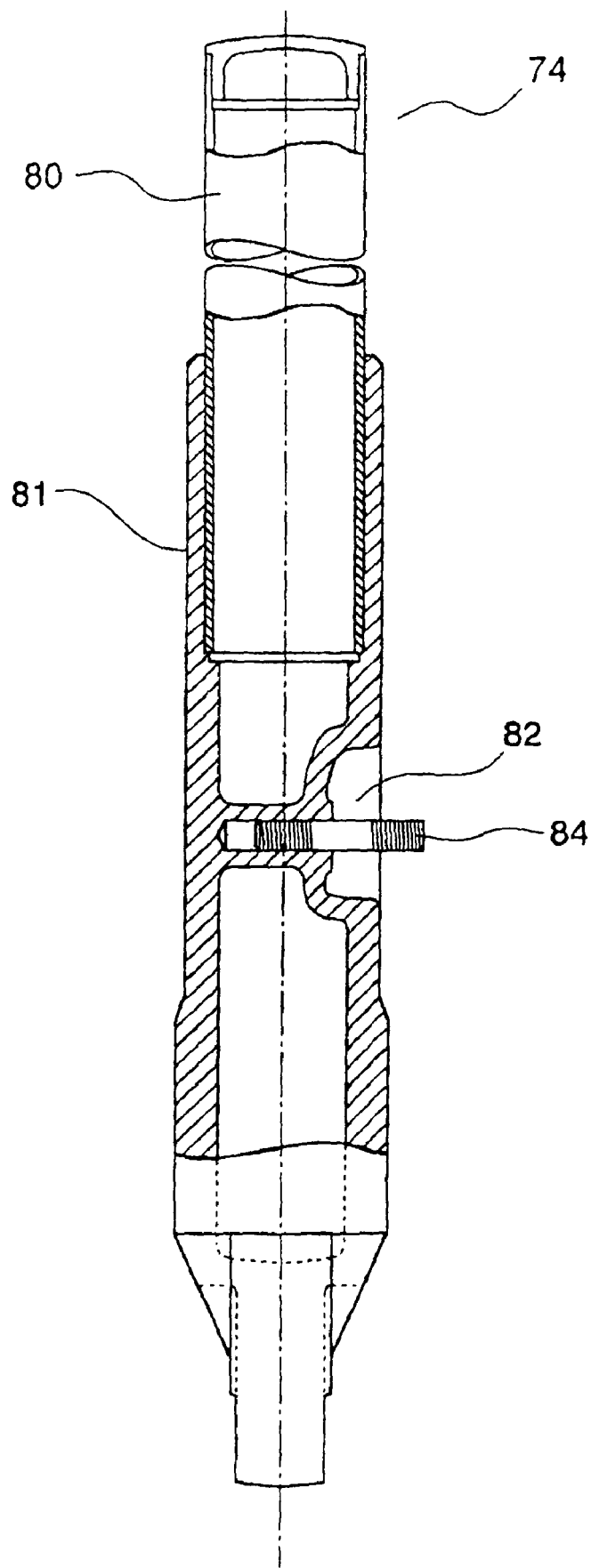
FIG. 6 is a sectional view for showing a preferred embodiment of the present invention, a front fork of a composing element of a link-type front suspension device.

As shown in FIGS. 5 and 6, each of a pair of right and left front forks 74 is constituted by two members, i.e. an upper pipe portion 80 fixed to the top bridge 72 and the bottom bridge 73; and a lower axle holder portion 81 in which the upper pipe portion 80 is inserted into and fixed to the upper end and the front wheel supporting arm 76 is fixed to the lower end. As the axle holder portion 81, a casted product having a degree of freedom in its shape is employed. A recess 82 recessed by a predetermined depth from its surface is formed at a location of an intermediate portion in a longitudinal direction of the axle holder portion 81 and becoming an inside part (the side of the front wheel 7) when it is assembled into a chassis.

The front end of the torque link 83 is inserted into and arranged at the recess 82. Then, a fixing bolt 84 threadably fitted at its inner end to the axle holder portion 81 is inserted into an engaging hole at the front end of the torque link 83, a nut 84a is threadably engaged with the outer end thread of the fixing bolt with the torque link 83 being held between them and fastened, thereby the torque link 83 is rotatably attached to the axle holder portion 81 (refer to FIG. 5).

In addition, the rear end of the torque link 83 is rotatably attached to a caliper 85.

In this way, in the case that the torque link 83 is connected to the front fork 74, the side facing the front wheel 7 inside the front fork 74 is recessed to form a recess 82 and a front end of the torque link 83 is connected under utilization of the recess 82, i.e. the connecting space for the torque link 83 is assured by forming the recess 82 inside the front fork 74, so that there is no need for the front fork 74 to be widened for connecting the torque link 83. Thus, it becomes possible to arrange the front fork 74 while keeping an initial predetermined space-apart clearance.

The push rod 78 is constructed as a divided structure comprised of a pair of right and left rod members 78a, 78a. The lower ends of these rod members 78a, 78a are rotatably arranged at an intermediate part of the front wheel supporting arm 76 in a vertical direction. In addition, the upper ends of the rod members 78a, 78a are rotatably attached to each of the right and left portions of the cushion arm 77 in a vertical direction (See FIG. 4).

In addition, each of the right and left rod members 78a, 78a constituting the push rod 78 is arranged at a rear part of the pair of right and left front forks 74 in such a way that it overlaps the front forks 74 as seen in its front elevational view.

Figure 9A:
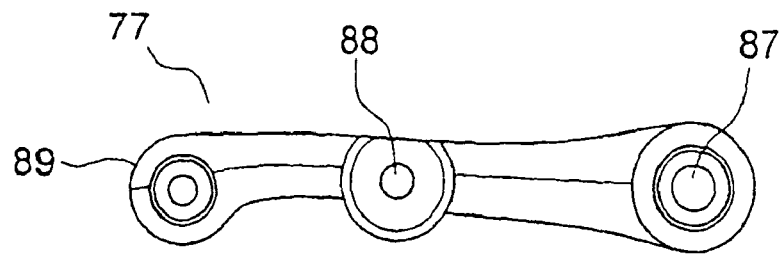
FIGS. 9(a) and (b) show a preferred embodiment of the present invention and illustrate two views of a cushion arm of a composing element of a link-type front suspension device.

As shown in FIGS. 9(a) and (b), the entire cushion arm 77 is formed as a substantial plate-like member, wherein its rear end is provided with a pivot 87 rotatably supported at the bottom bridge 73, the supporting axle 88 rotatably attached to the right and left rod members 78a, 78a of the push rod 78 is fixed to the side edges protruded in a lateral direction of the intermediate part, and the front end is formed with the two slit parts 89 rotatably connected to the lower end of the shock absorber 79.

Then, the cushion arm 77 is arranged such that the front end always springs upward such that a space C can be assured between the cushion arm 77 and the front fender 8 (refer to FIGS. 3 and 4).

A bracket 90 (refer to FIG. 4) is fixed to the axle 75 of the front wheel 7, a caliper 85 for applying a break force against the front wheel 7 through a disk 91 integrally rotated with the axle 75 is fixed to the bracket 90. A rear end of the torque link 83 is rotatably attached to the front end of the caliper 85. In addition, a supporting stay 92 is fixed to the axle 75 of the front wheel 7, and a front fender 8 is supported by the supporting stay 92. In addition, the intermediate part of the supporting stay 92 is supported by a link 93 placed between it and the push rod 78, and the supporting stay 92 is restricted in its rotation around the axle 75 in a vertical direction.

A pair of right and left shock absorbers 79 are provided and they are arranged between the front forks 74 in a lateral arranged state. The pair of right and left shock absorbers 79 is formed as a structure, in which one shock absorber 79a is provided with only a spring 94 for absorbing a load, and the other shock absorber 79b is provided with only a damper 95 for attenuating vibration caused by a spring 94 (refer to FIGS. 5, 7 and 8). Further, although the spring 96 is also arranged inside the shock absorber 79b provided with the damper 95, the spring 96 is used only for accepting a load in an auxiliary manner. Due to this fact, its diameter is small as compared with that of the main spring 94 stored in one shock absorber 79a, and its length is also short. Further, each of the pair of right and left shock absorbers 79a, 79b is covered by a cover in such a way that their outer appearances may become the same to each other.

In this way, the pair of right and left shock absorbers 79 (79a, 79b) are divided into one having the spring 94 for absorbing a load and the other having the damper 95 for generating an attenuation force. This makes it possible for a diameter of each of the shock absorbers to be made small as compared with that having both shock absorbers 79 (79a, 79b) of a common structure having both a spring and a damper. As a result, a space between the front forks 74 is not necessarily widened for arranging the pair of shock absorbers between them. In other words, it becomes possible to arrange the front forks 74 while keeping an initial predetermined space therebetween.

In addition, the pair of right and left shock absorbers 79 (79a, 79b) as described above are divided into one having a spring 94 for absorbing a load and the other provided with a damper 95 for generating an attenuation force, so that it is possible that these shock absorbers 79a, 79b be light weight.

A structure for fixing the pair of shock absorbers 79a, 79b to the upper bracket 86 will be described, wherein as shown in FIGS. 10(a)–(d), the upper bracket 86 is constructed such that a part in a circumferential direction is of a slit-structure at its right and left ends, and these ends are provided with engaging holes 97 fastened with a bolt to enable their diameters to be variable. The pair of right and left front forks 74 are inserted and fixed in the engaging holes 97. In addition, the central part of the upper bracket 86 has through-pass holes 98 passing in a vertical direction when it is assembled into the chassis while being spaced apart by a predetermined space in a lateral direction. Each of both right and left sides of these through-pass holes 98 is formed with a hub 99, these hubs 99 are formed with a bolt inserting threaded hole 100.

Then, the plate-like engaged segments 101 arranged at the upper end portions of the shock absorbers 79a, 79b are inserted into the through-pass holes 98 of the upper bracket 86. After adjusting the engagement holes 102 formed at the plate-like engaged segments 101 and the threaded holes 100 of the hubs 99 in such a way that they are coaxial to each other, the bolts 103 are inserted into these holes, and fastened. The pair of shock absorbers 79a, 79b then become rotatably attached to the upper bracket 86 in a vertical direction (refer to FIG. 5).

Figure 7:
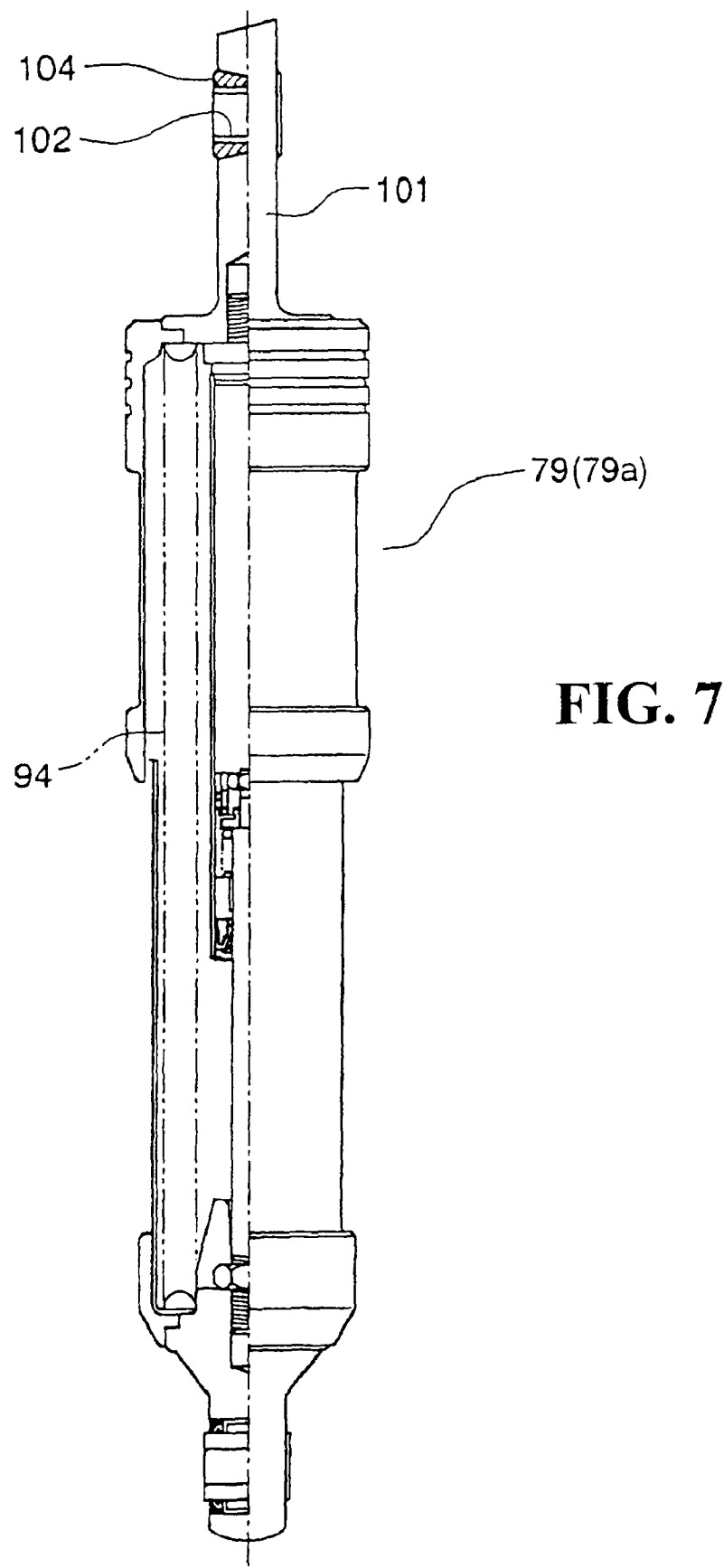
FIG. 7 is a partial sectional view for showing a preferred embodiment of the present invention and for illustrating one of shock absorbers of a composing element of a link-type front suspension device of the present invention.
Figure 8:
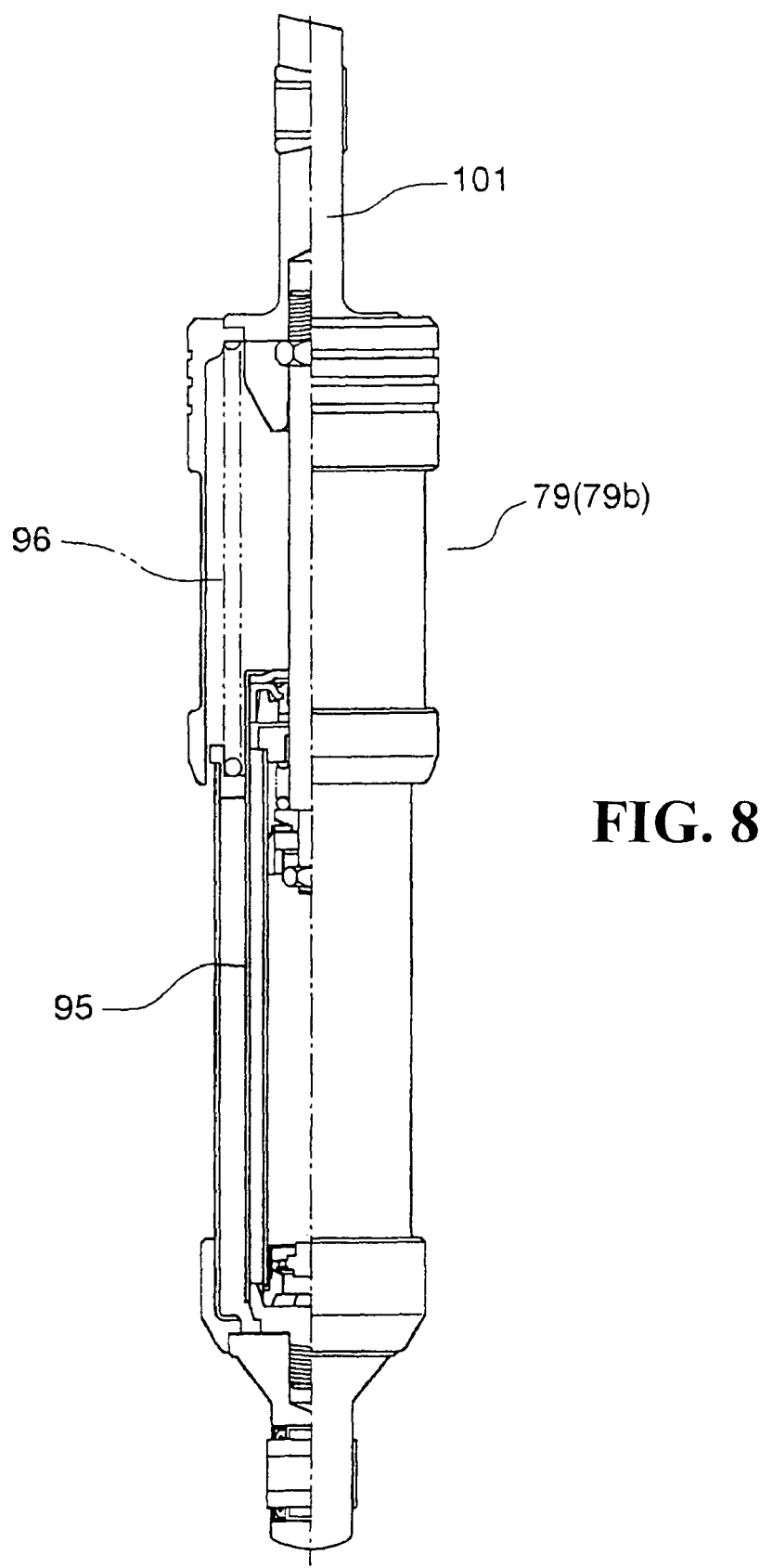
FIG. 8 is a partial sectional view for showing a preferred embodiment of the present invention and for illustrating the other of shock absorbers of a composing element of a link-type front suspension device of the present invention.

Further, a bushing 104 is placed between the engagement hole 102 of the engaged segment 101 of the shock absorber 79a and the bolt 103 so as to allow the shock absorber 79a to oscillate (refer to FIG. 7).

In this way, the hub 99 of the upper bracket 86 is formed to be protruded upwardly and the engaged segments 101 at the upper ends of the shock absorbers 79a, 79b are fixed to the hub 99, so that the shock absorbers 79a, 79b can be fixed while being displaced as upward as possible, the shock absorbers 79a, 79b having the predetermined length can be placed between the upper bracket 86 and the cushion arm 77 without displacing the upper bracket 86 in upward direction.

Next, an action of the link-type suspension device 3 having the aforesaid configuration will be described. A sinking amount of each of the link-type front suspension device 3 and the rear suspension device 34 is defined in reference to mounted load such as a weight of driver, a weight of fuel, or the like. When a certain irregularity occurs at a road surface during running of a motorcycle, the front wheel 7 moves up and down in compliance with the irregularity. As the front wheel 7 moves up and down, the front wheel supporting arm 76 oscillates up and down around a location supported at the lower end of the front fork 77, and this oscillation is transmitted to the shock absorber 79 through the push rod 78 and the cushion arm 77.

Then, the shock absorber 79 performs an extending or retracting action, thus absorbing the vibration of the chassis caused by the irregularity at the road surface. In addition, at the time of applying a brake action, the calipers 85 hold the disk 91 from both right and left sides, thereby a braking force may act against the front wheel 7. At this time, the calipers 85 try to rotate around the axle 75 together with the disk 91. The rotation of the caliper 85 is prohibited because the torque link 83 is placed between each of the calipers 85 and the front fork 74, the torque link 83 being tensioned to restrict a forward motion of the calipers 85.

Figure 9B:
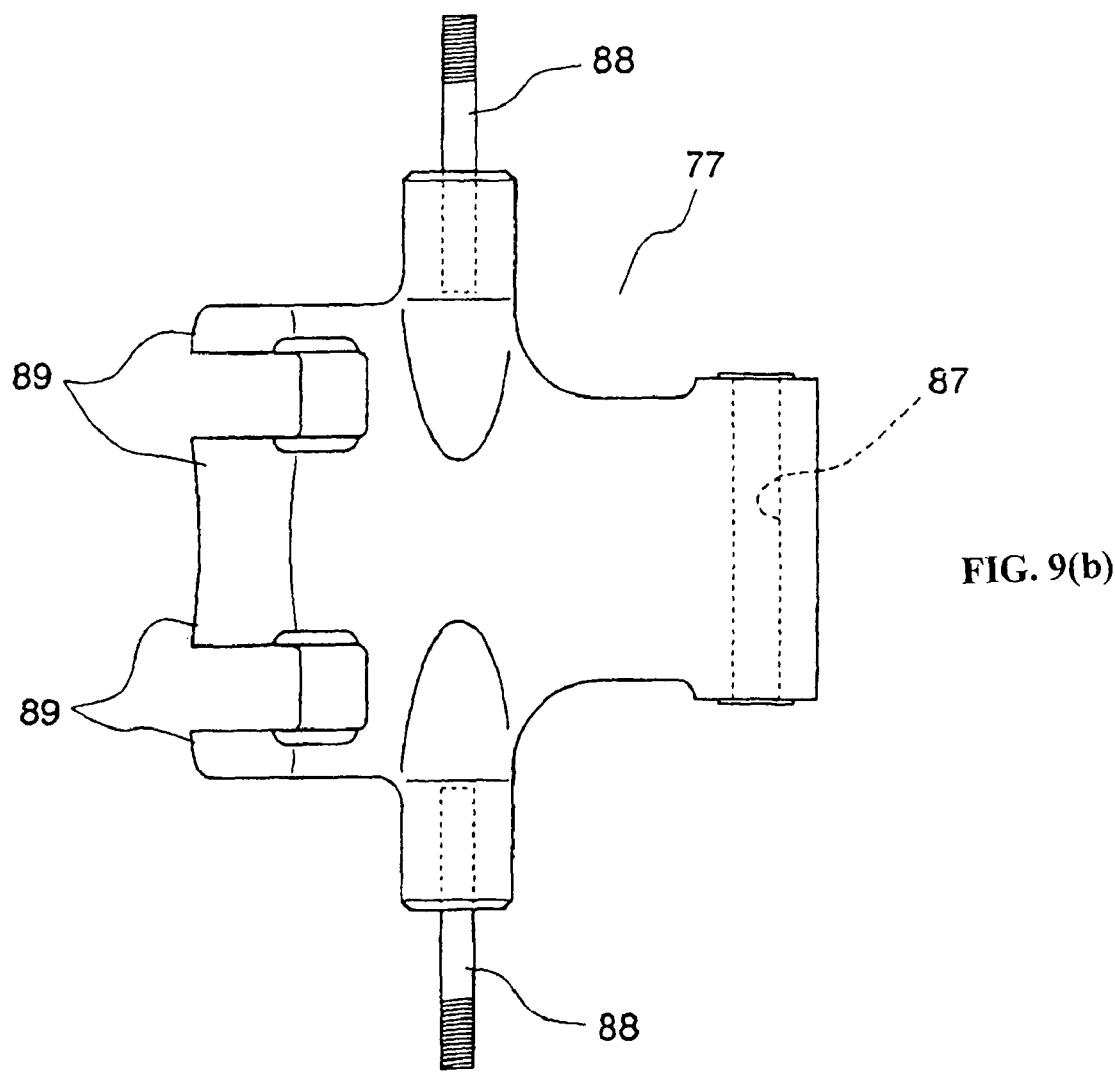

In accordance with the link-type front suspension device 3 of the aforesaid preferred embodiment, the push rod 78 is of a slit-structure comprised of a pair of right and left rod members 78a, 78a, wherein the upper ends of these rod members 78a, 78a are connected to the supporting shaft 88 protruded in a lateral direction of the cushion arm 77 individually (refer to FIG. 9), there is no member between the right and left front forks 74 above the front fender 8, and a space C having an appropriate area is formed (refer to FIGS. 3 and 4). During running operation, the space may act as an engine cooling air feeding inlet and the engine cooling air can be fed positively from the space C, resulting in that a preferable engine cooling can be realized.

In addition, the right and left rod members 78a, 78a of the push rod 78 are arranged at a rear part of the front fork 74 and at a portion where they overlap the front forks 74 as seen in its front elevational view, i.e. the portion becoming a rear part of each of the front forks 74, so that these rod members 78a do not restrict the flow of engine cooling air passing through the space C, and in view of this fact, a rational engine cooling can be carried out.

Further, the aforesaid preferred embodiment is at most an illustration of the present invention, and it can be properly changed in design within a range not departing from the gist of the present invention as required.

For example, in the case of the aforesaid preferred embodiment, the front wheel supporting arms 76 are arranged to extend from the axle 75 of the front wheel 7 in a forward direction, and in turn, the present invention can be applied to the link-type front suspension device extending from the axle 75 of the front wheel 7 in a rearward direction.

In addition, although the preferred embodiment has been described in reference to the case of the motorcycle, the present invention is not limited to the motorcycle, but it can be applied to a three-wheeled vehicle or a buggy-type four-wheeled vehicle.

As described above in detail, in accordance with the link-type front suspension device in a vehicle such as a motorcycle according to the first aspect of the present invention, the push rod is of a slit-structure comprised of a pair of right and left rod members and the lower ends of these rod members are rotatably attached to the front wheel supporting arms, respectively, so that there are no elements between the right and left front forks above the front fender to restrict a flow of running air toward the engine and a space having an appropriate area connecting in a forward or rearward direction is formed. Thus, during the running operation, the space may act as an engine cooling air feeding inlet, and a preferable engine cooling can be realized.

In accordance with the link-type front suspension device in a vehicle such as a motorcycle according to the second aspect of the present invention, the rod members constituting the push rod are arranged at rear portions of a pair of right and left front forks, so that these rod members do not prevent a flow of engine cooling air passing through the space between the right and left front forks. In view of this fact, a rational engine cooling can be carried out.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A link-type front suspension device in a vehicle, comprising:
    a pair of right and left front forks rotatably supported at a front part of a chassis frame;
    a pair of front wheel supporting arms having one end rotatably attached to lower ends of said pair of right and left front forks and having the other end rotatably supporting an axle of a front wheel;
    a cushion arm rotatably attached to a bottom bridge in a vertical direction;
    a push rod having a lower end rotatably connected to an intermediate part of one of the front wheel supporting arms and having an upper end connected to the cushion arm; and
    shock absorbers installed between the upper part of said front fork and said cushion arm,
    wherein said push rod is a split structure including a pair of right and left rod members, lower ends of the rod members being rotatably attached to the front wheel supporting arms, and upper ends of the rod members being rotatably connected to right and left sides of said cushion arm.

2. The link-type front suspension device in a vehicle according to claim 1, wherein the rod members constituting said push rod are arranged at rear sides of said pair of right and left front forks in such a way that the rod members overlap the front forks as seen in a front elevational view.

3. The link-type front suspension device in a vehicle according to claim 1, wherein each of the right and left front forks includes an upper pipe portion fixed to a top bridge and the bottom bridge, and a lower axle holder portion having an upper end into which the upper pipe portion is inserted and a lower end fixed to the front wheel supporting arm, and
    wherein a recess facing the front wheel is formed at an intermediate portion of each of the lower axle holder portions, so that a torque link connected to each of the lower axle portions in the recess is substantially overlapped by the lower axle holder portion as seen from a front elevation view.

4. The link-type front suspension device in a vehicle according to claim 3, wherein the torque links being connected in the recesses prevents a reduction of a clearance between portions of the right and left front forks above a front fender.

5. The link-type front suspension device in a vehicle such as a motorcycle according to claim 1, wherein the cushion arm is formed as a plate and is arranged such that a front end of the plate springs upward when the shock absorbers are compressed, thus assuring a space is maintained between the cushion arm and a fender over the front wheel.

6. The link-type front suspension device in a vehicle according to claim 1, wherein a space is provided between lower ends of the shock absorbers and a front fender so that during operation air strikes a radiator of the engine.

7. The link-type front suspension device in a vehicle according to claim 1, wherein the shock absorbers include a first shock absorber provided with a spring for absorbing a load, and a second shock absorber provided with a damper for attenuating vibration caused by the spring.

8. The link-type front suspension device in a vehicle according to claim 1, wherein the front wheel supporting arm extends from the axle of the front wheel in a forward direction.

9. The link-type front suspension device in a vehicle according to claim 1, wherein the front wheel supporting arm extends from the axle of the front wheel in a reward direction.

10. The link-type front suspension device in a vehicle according to claim 1, further comprising supporting stays fixed to the axle of the front wheel, and a front fender supported by the supporting stays,
    wherein an intermediate part of each of the supporting stays is supported by a link placed between the supporting stay and the push rod, the links overlapping the front forks as seen in a front elevation view.

11. A link-type front suspension device in a motorcycle, comprising:
    a pair of right and left front forks with top portions thereof passing through holes of an upper bracket and being fixed to a top bridge attached to a chassis frame;
    a front wheel supporting arm having one end rotatably attached to lower ends of said pair of right and left front forks and having the other end rotatably supporting an axle of a front wheel;
    a cushion arm extending laterally and being rotatably attached to a bottom bridge and being rotatable in a vertical direction;
    a push rod having a lower end rotatably connected to an intermediate part of the front wheel supporting arm and having upper end connected to the cushion arm;
    shock absorbers installed between the upper bracket and said cushion arm,
    wherein said push rod is a split structure including a pair of right and left rod members, lower ends of the rod members being rotatably attached to the front wheel supporting arm, and upper ends of the rod members being rotatably attached to opposite ends of a supporting axle which extends laterally through said cushion arm.

12. The link-type front suspension device in a motorcycle according to claim 11, wherein the rod members constituting said push rod are arranged at rear sides of said pair of right and left front forks in such a way that the rod members overlap the front forks as seen in a front elevational view.

13. The link-type front suspension device in a motorcycle according to claim 11, wherein each of the right and left front forks includes an upper pipe portion fixed to the top bridge and the bottom bridge, and a lower axle holder portion having an upper end into which the upper pipe portion is inserted and a lower end fixed to the front wheel supporting arm, and
    wherein a recess facing the front wheel is formed at an intermediate portion of each of the lower axle holder portions, so that a torque link connected to each of the lower axle portions in the recess is substantially overlapped by the lower axle holder portion as seen from a front elevation view.

14. The link-type front suspension device in a motorcycle according to claim 13, wherein the torque links being connected in the recesses prevents a reduction of a clearance between portions of the right and left front forks above a front fender.

15. The link-type front suspension device in a motorcycle such as a motorcycle according to claim 11, wherein the cushion arm is formed as a plate and is arranged such that a front end of the plate springs upward when the shock absorbers are compressed, thus assuring a space is maintained between the cushion arm and a fender over the front wheel.

16. The link-type front suspension device in a motorcycle according to claim 11, wherein a space is provided between lower ends of the shock absorbers and a front fender so that during operation air strikes a radiator of the engine.

17. The link-type front suspension device in a motorcycle according to claim 11, wherein the shock absorbers include a first shock absorber provided with a spring for absorbing a load, and a second shock absorber provided with a damper for attenuating vibration caused by the spring.

18. The link-type front suspension device in a motorcycle according to claim 11, wherein the front wheel supporting arm extends from the axle of the front wheel in a forward direction.

19. The link-type front suspension device in a motorcycle according to claim 11, wherein the cushion arm is formed as a single plate-shaped member having two slit parts at a front end thereof, the two slit parts being rotatably connected to the shock absorbers, the two slit parts substantially overlapping the supporting axle when seen from a front elevation view.

20. The link-type front suspension device in a motorcycle according to claim 11, further comprising supporting stays fixed to the axle of the front wheel, and a front fender supported by the supporting stays,
    wherein an intermediate part of each of the supporting stays is supported by a link placed between the supporting stay and the push rod, the links overlapping the front forks as seen in a front elevation view.

21. A link-type front suspension device in a motorcycle, comprising:
    a pair of right and left front forks with top portions thereof passing through holes of an upper bracket and being fixed to a top bridge attached to a chassis frame;
    a front wheel supporting arm having one end rotatably attached to lower ends of said pair of right and left front forks and having the other end rotatably supporting an axle of a front wheel;
    a cushion arm rotatably attached to a bottom bridge and being rotatable in a vertical direction;
    a push rod having a lower end rotatably connected to an intermediate part of the front wheel supporting arm and having upper end connected to the cushion arm; and
    shock absorbers installed between the upper bracket and said cushion arm, wherein said push rod is a split structure including a pair of right and left rod members, lower ends of the rod members being rotatably attached to the front wheel supporting arm, and upper ends of the rod members being rotatably attached to said cushion arm; and further comprising supporting stays fixed to the axle of the front wheel, and a front fender supported by the supporting stays, wherein an intermediate part of each of the supporting stays is supported by a link placed between the supporting stay and the push rod, the links overlapping the front forks as seen in a front elevational view.

* * * * *